(12) United States Patent
Akiyoshi

(10) Patent No.: US 10,025,146 B2
(45) Date of Patent: Jul. 17, 2018

(54) LIQUID CRYSTAL DISPLAY DEVICE

(71) Applicant: Japan Display Inc., Minato-ku (JP)

(72) Inventor: Muneharu Akiyoshi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/378,457

(22) Filed: Dec. 14, 2016

(65) Prior Publication Data

US 2017/0176823 A1 Jun. 22, 2017

(30) Foreign Application Priority Data

Dec. 17, 2015 (JP) .................. 2015-246117

(51) Int. Cl.
*G02F 1/1343* (2006.01)
*G02F 1/1362* (2006.01)
*G02F 1/1337* (2006.01)
*G02F 1/1368* (2006.01)
*G02F 1/1333* (2006.01)
*G02F 1/1335* (2006.01)

(52) U.S. Cl.
CPC ...... *G02F 1/134336* (2013.01); *G02F 1/1337* (2013.01); *G02F 1/1368* (2013.01); *G02F 1/133345* (2013.01); *G02F 1/133512* (2013.01); *G02F 1/136213* (2013.01); *G02F 1/136227* (2013.01); *G02F 1/136286* (2013.01); *G02F 2001/13685* (2013.01); *G02F 2001/133738* (2013.01); *G02F 2001/134345* (2013.01); *G02F 2001/134372* (2013.01); *G02F 2001/136222* (2013.01); *G02F 2201/121* (2013.01); *G02F 2201/122* (2013.01); *G02F 2201/123* (2013.01)

(58) Field of Classification Search
None
See application file for complete search history.

(56) References Cited

U.S. PATENT DOCUMENTS

| | | |
|---|---|---|
| 2010/0194697 A1 | 8/2010 | Hotelling et al. |
| 2010/0194699 A1 | 8/2010 | Chang |
| 2010/0194707 A1 | 8/2010 | Hotelling et al. |
| 2012/0262406 A1 | 10/2012 | Hotelling et al. |
| 2013/0106755 A1 | 5/2013 | Hotelling et al. |
| 2013/0242239 A1* | 9/2013 | Chang ............... G02F 1/133707 349/106 |
| 2013/0300953 A1 | 11/2013 | Hotelling et al. |
| 2015/0363032 A1 | 12/2015 | Hotelling et al. |
| 2016/0202544 A1* | 7/2016 | Ro ................. G02F 1/1362 359/890 |
| 2016/0313614 A1* | 10/2016 | Woo ............... G02F 1/133345 |

FOREIGN PATENT DOCUMENTS

JP 2010-231773 10/2010

* cited by examiner

*Primary Examiner* — Dennis Y Kim
(74) *Attorney, Agent, or Firm* — Oblon, McClelland, Maier & Neustadt, L.L.P.

(57) ABSTRACT

According to one embodiment, a liquid crystal display device includes a first substrate, a second substrate, and a liquid crystal layer. The first substrate includes an organic insulating film, a first electrode formed on the organic insulating film, an inorganic insulating film formed on the first electrode, a second electrode formed on the inorganic insulating film, and an alignment film. The alignment film is in contact with the organic insulating film and the second electrode.

7 Claims, 12 Drawing Sheets

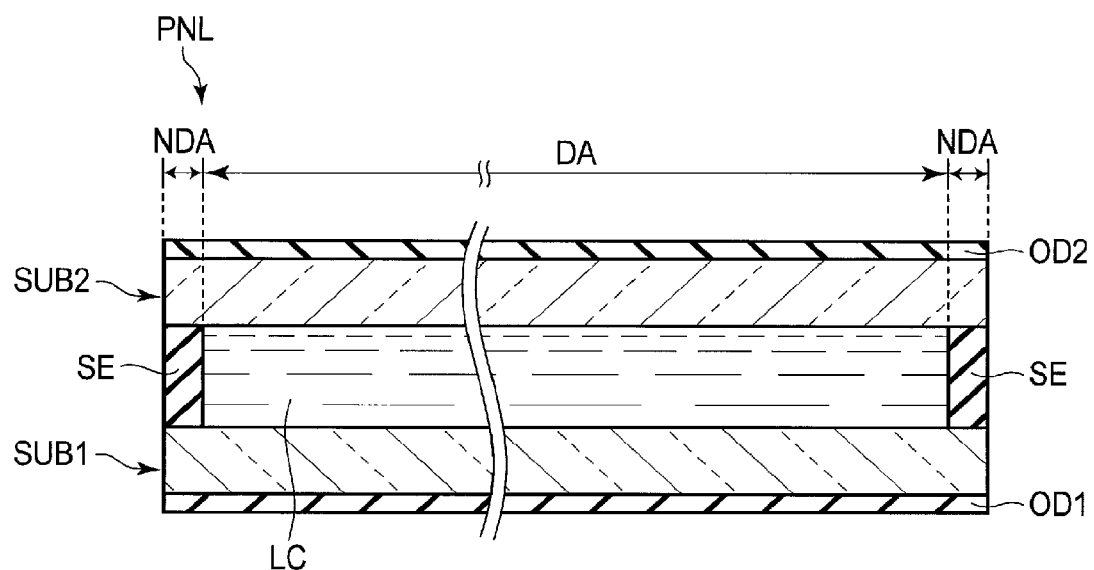
F I G. 2

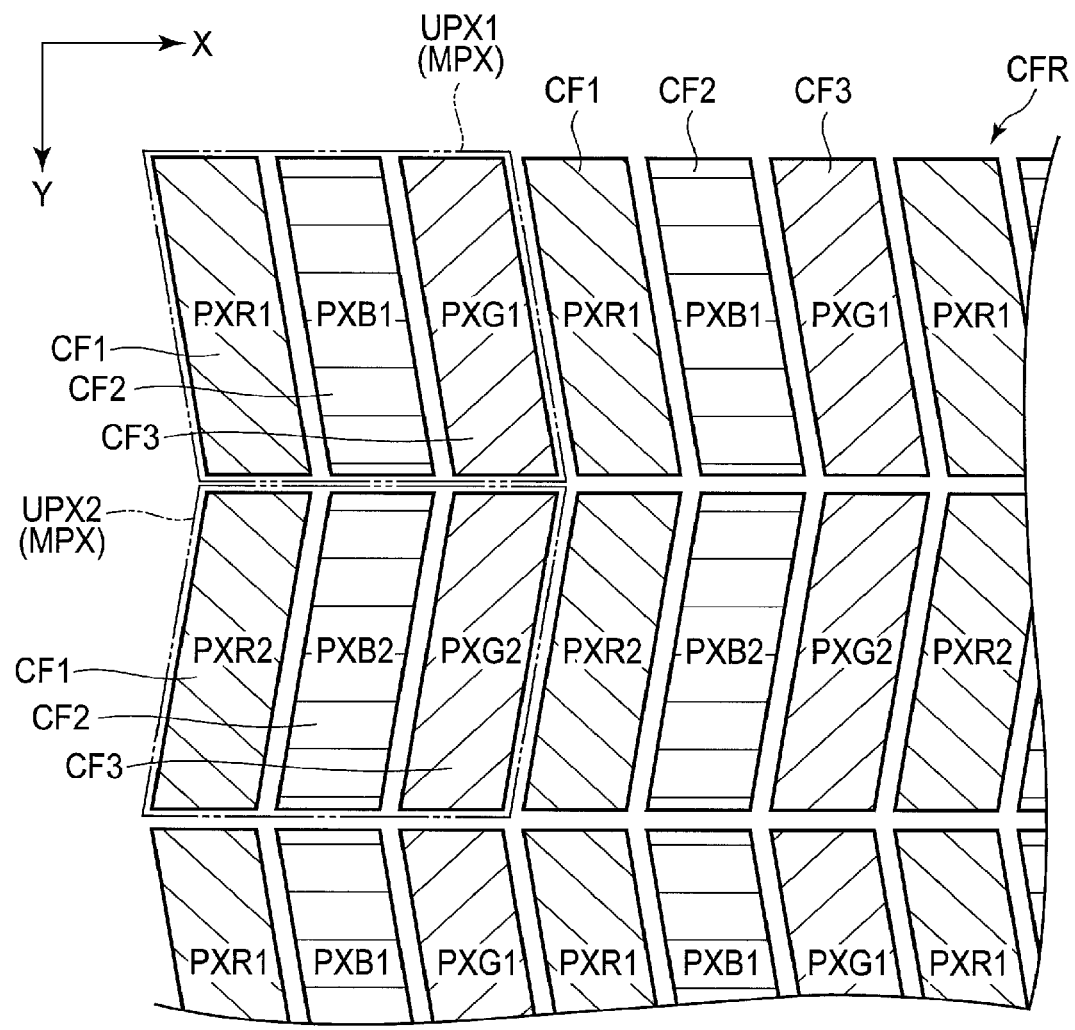
F I G. 3

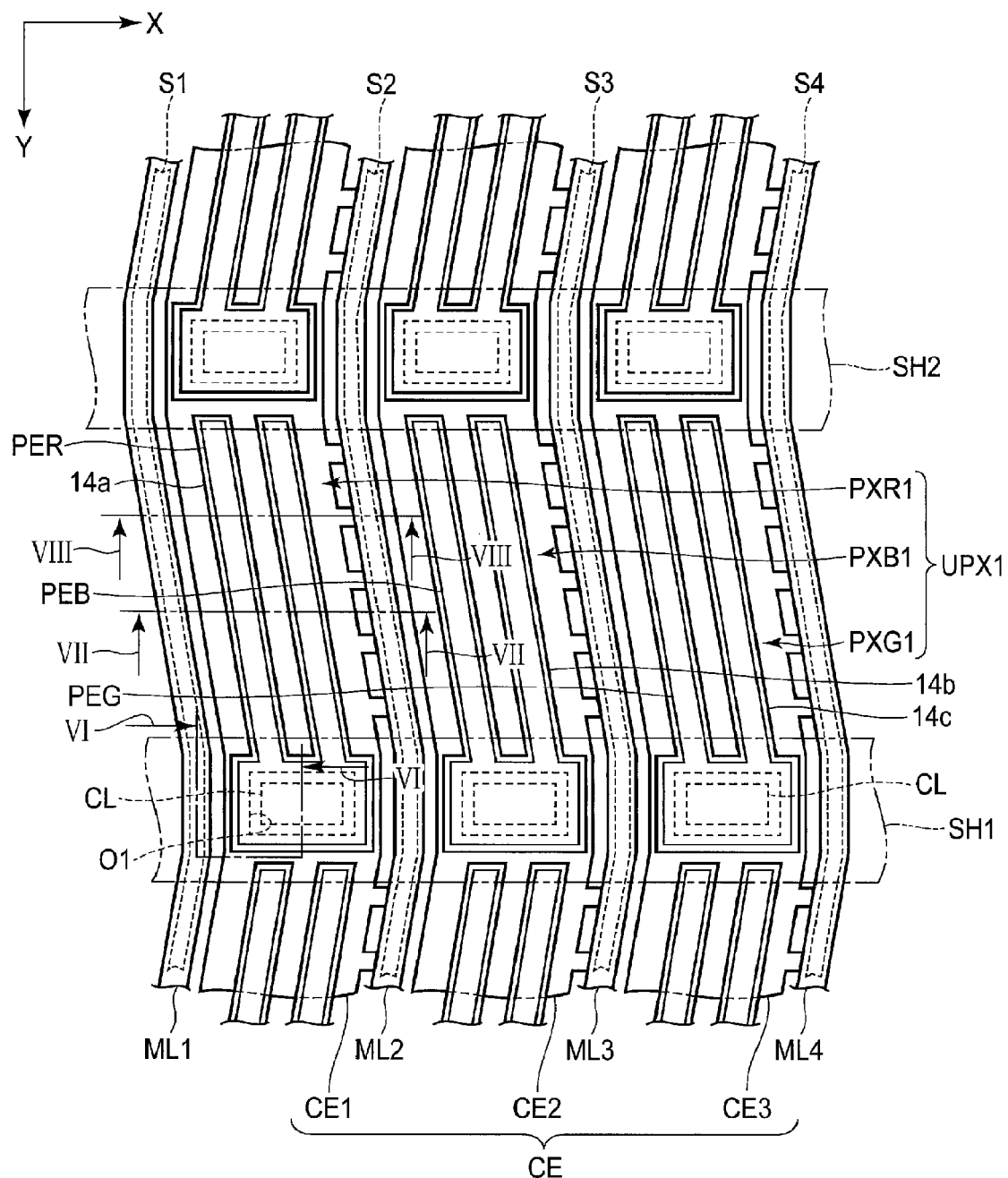
F I G. 5

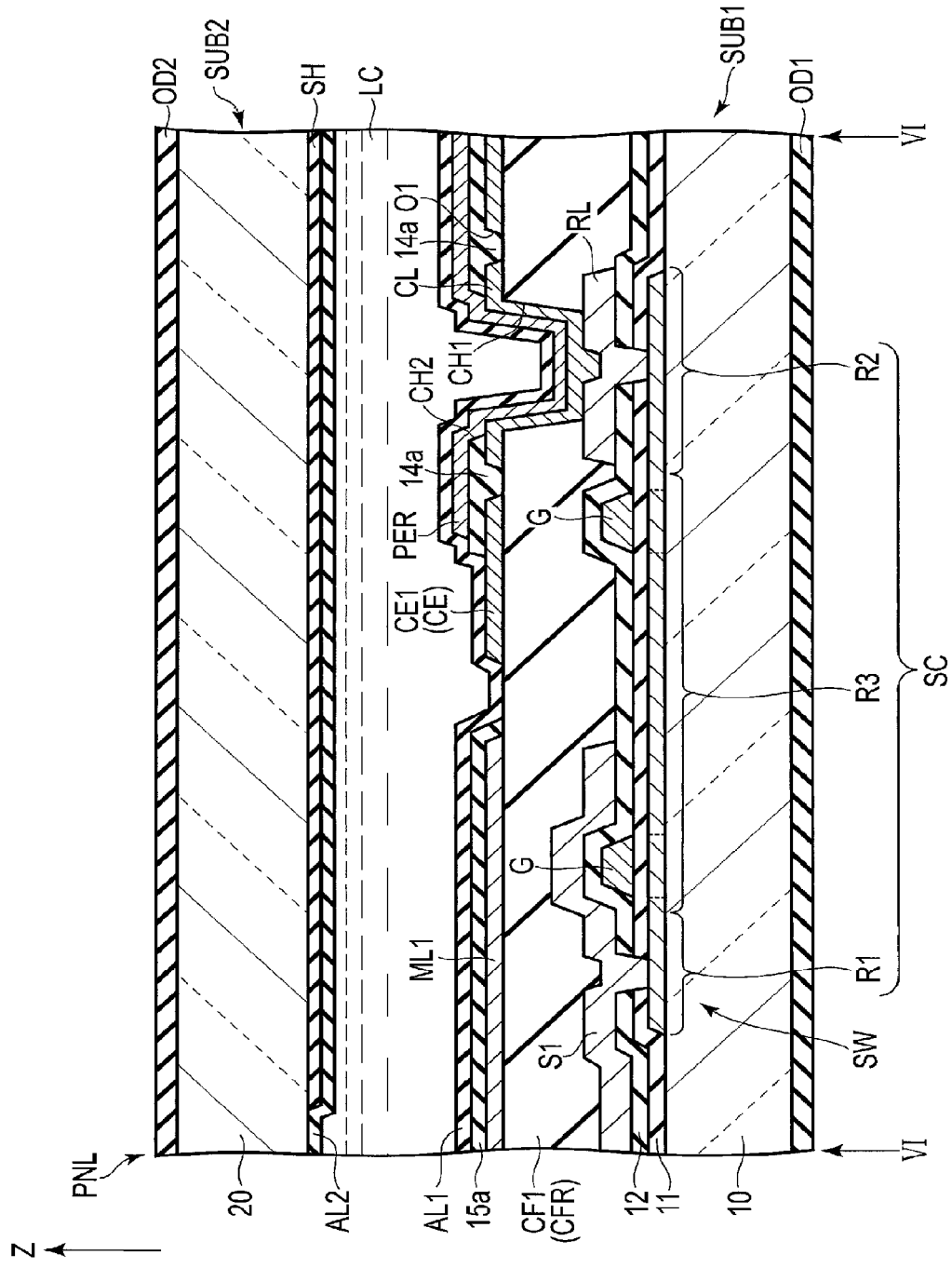
F I G. 6

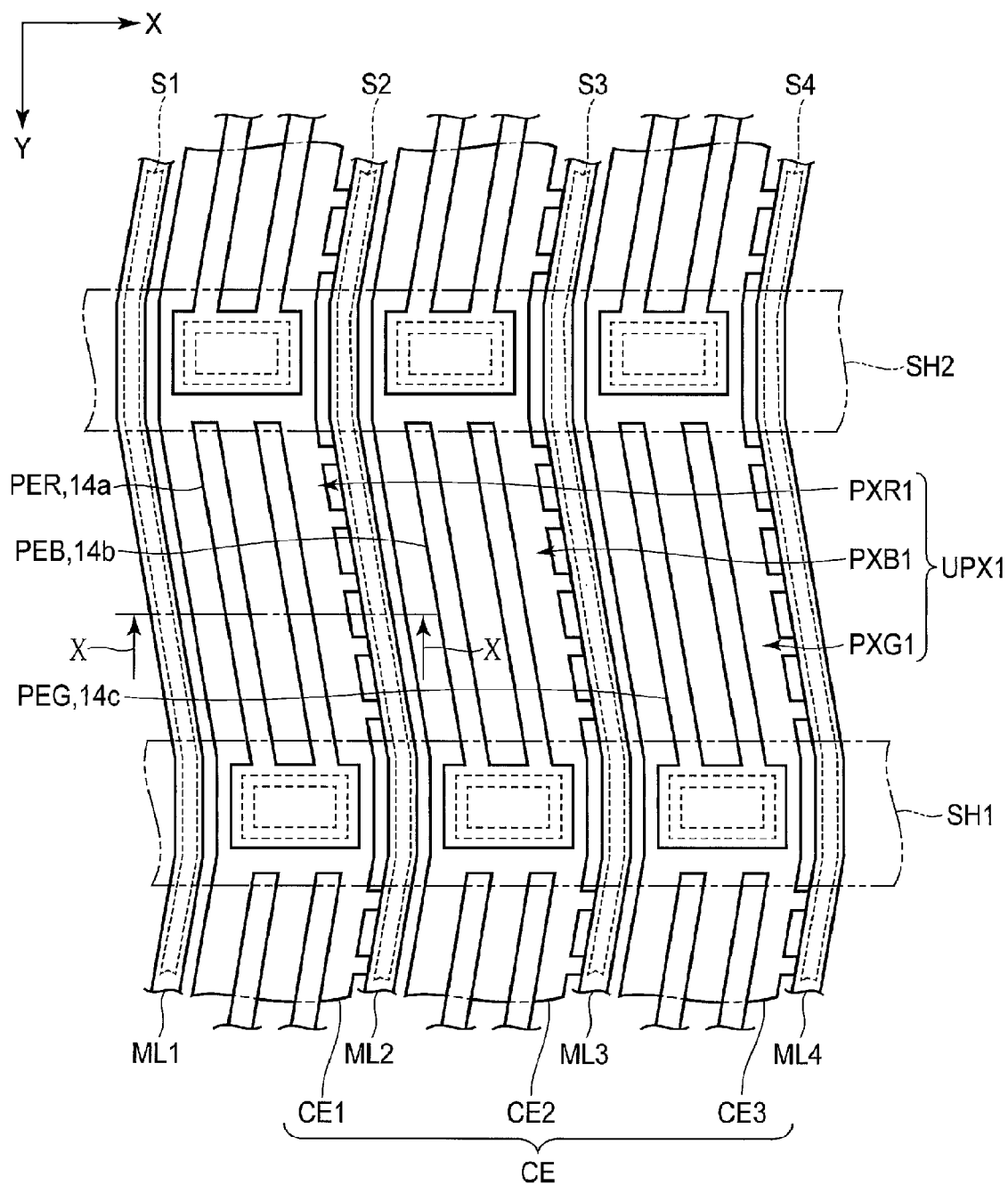
F I G. 9

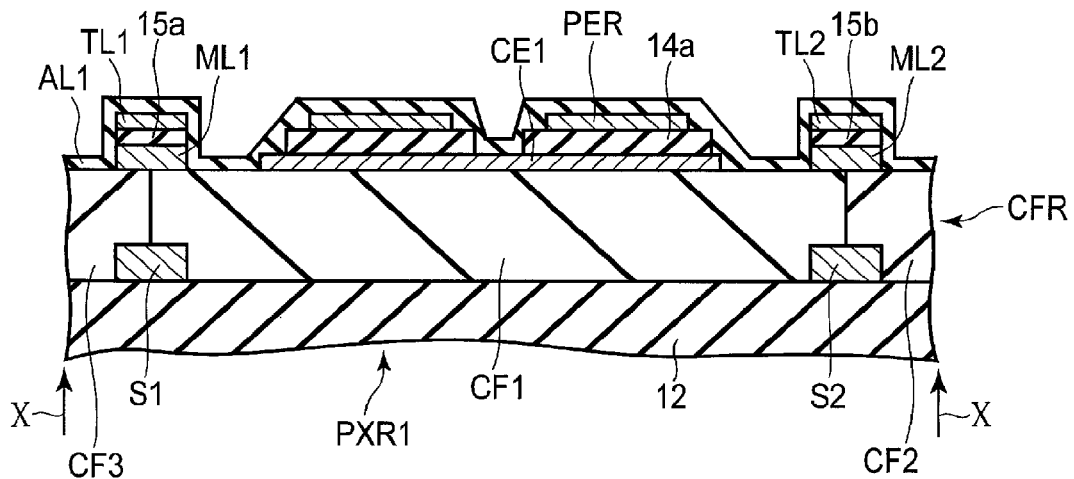
F I G. 10
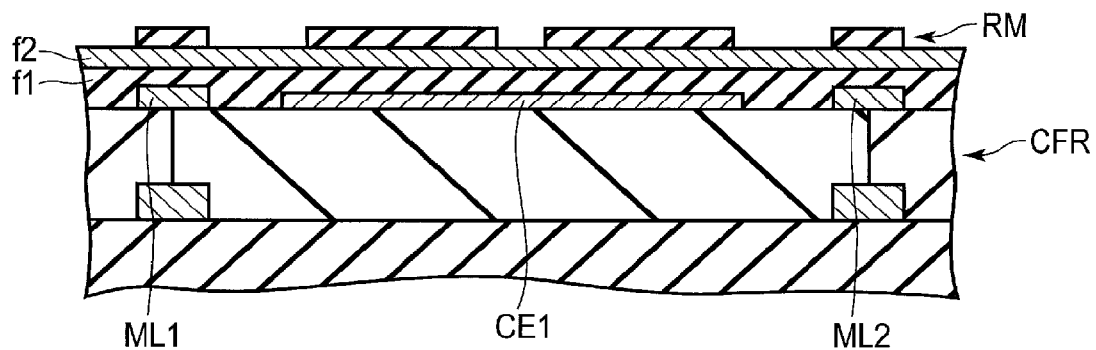
F I G. 11

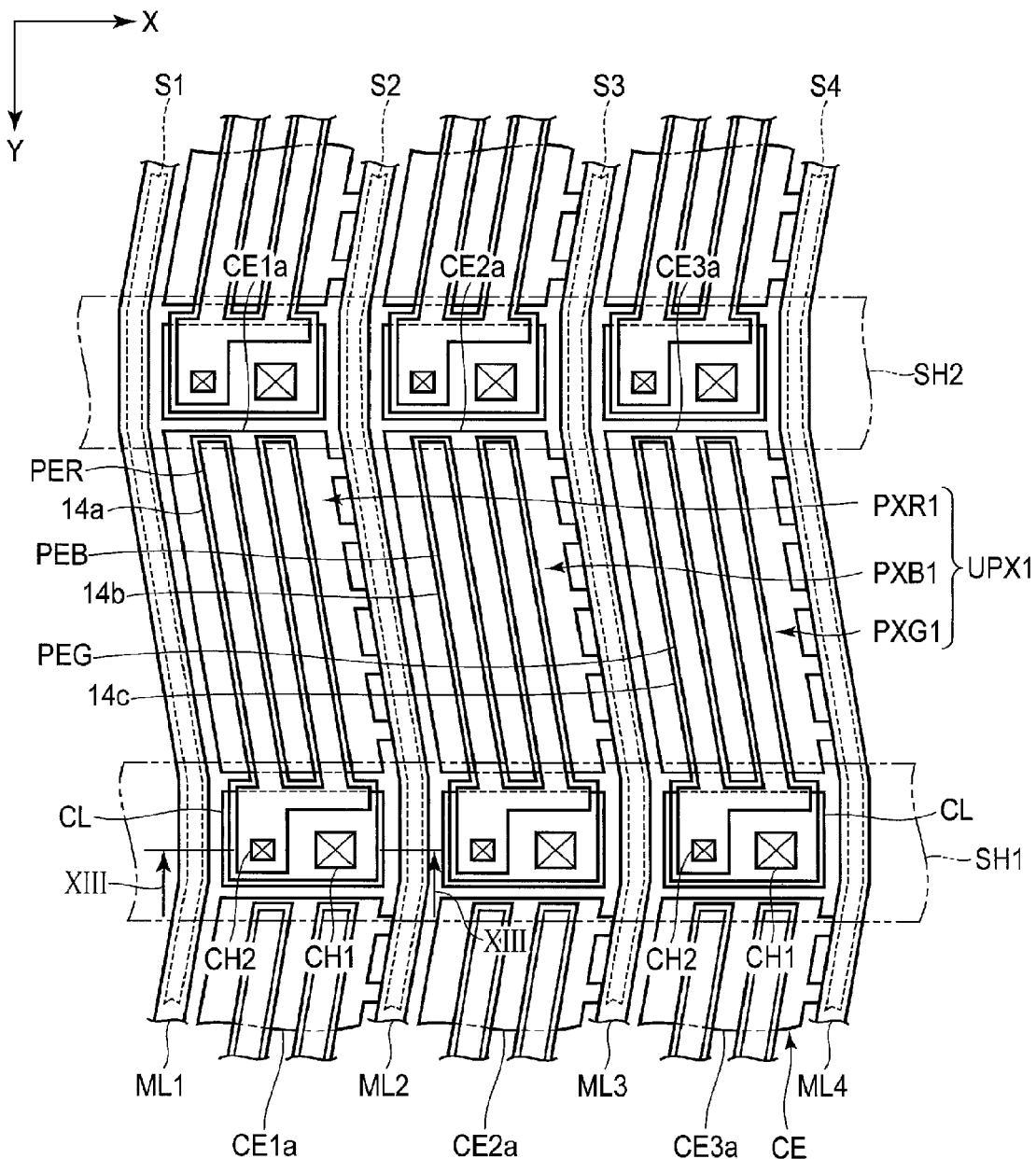
F I G. 12

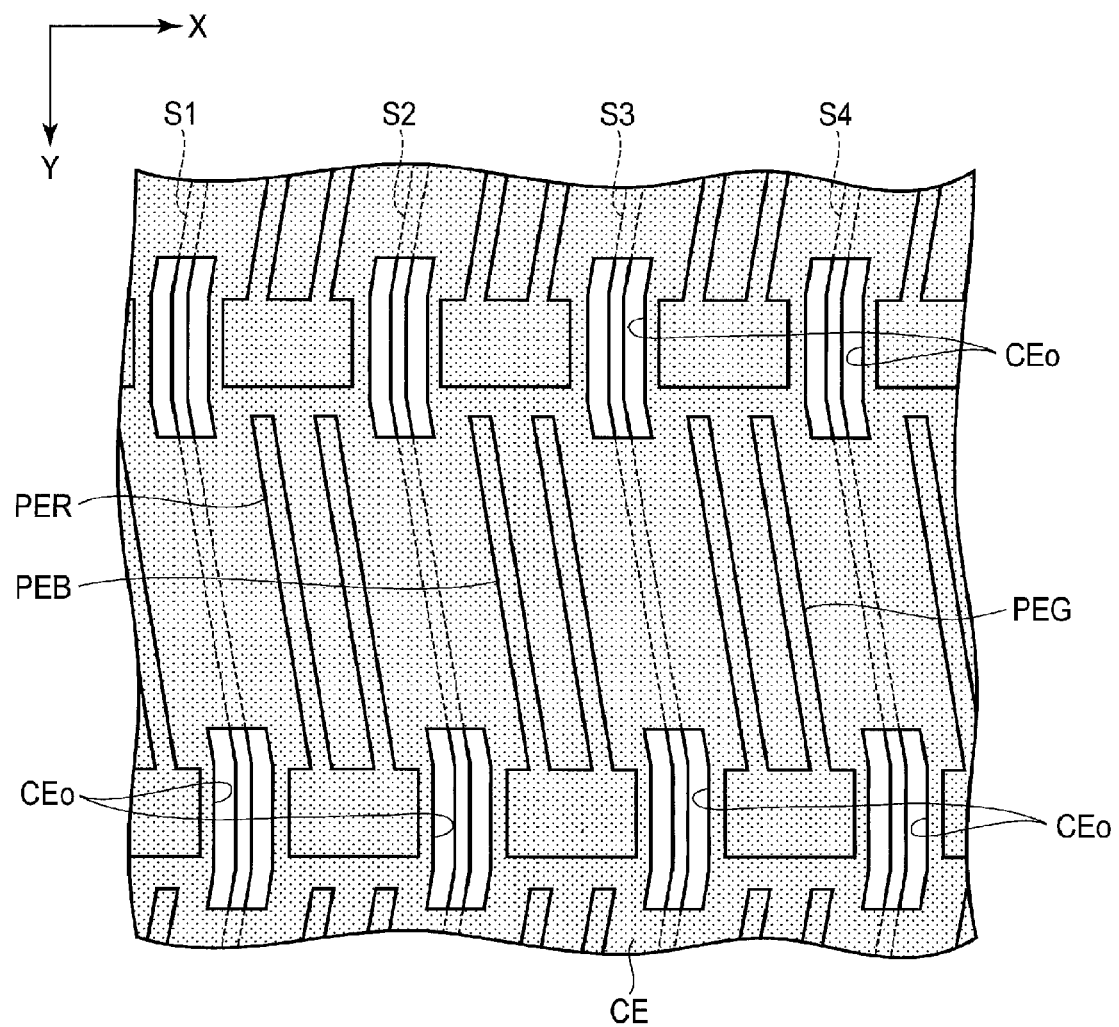
F I G. 14

LIQUID CRYSTAL DISPLAY DEVICE

CROSS-REFERENCE TO RELATED APPLICATIONS

This application is based upon and claims the benefit of priority from Japanese Patent Application No. 2015-246117, filed Dec. 17, 2015, the entire contents of which are incorporated herein by reference.

FIELD

Embodiments described herein relate generally to a liquid crystal display device.

BACKGROUND

Liquid crystal display devices are light and thin, and their power consumptions are low. By virtue of these features, they are applied to various fields and for example, as display devices of office automation equipment such as personal computers and those of television receivers. In recent years, liquid crystal display devices have also been used as display devices of portable terminal devices such as cell phones, of car navigation equipment, and of game consoles, etc.

Also, recent years, liquid crystal display panels adapted for a fringe field switching (FFS) mode have been put into practice.

BRIEF DESCRIPTION OF THE DRAWINGS

FIG. 2 is a cross-sectional view showing a liquid crystal display panel as illustrated in FIG. 1.

FIG. 3 is a view illustrating an example of an arrangement of pixels in the liquid crystal display panel as illustrated in FIGS. 1 and 2.

FIG. 5 is an enlarged plan view illustrating part of the liquid crystal display panel, and illustrates signal lines, metal lines, a first electrode, insulating layers, second electrodes and light-shielding layers.

FIG. 6 is a cross-sectional view of the liquid crystal display panel which is taken along line VI-VI in FIG. 5.

FIG. 9 is an enlarged plan view illustrating part of a liquid crystal display panel of a liquid crystal display device according to a second embodiment, and illustrates signal lines, metal lines, a first electrode, insulating layers, second electrodes and light-shielding layers.

FIG. 10 is a cross-sectional view of a first substrate which is taken along line X-X in FIG. 9.

FIG. 11 is a view for explaining a manufacturing method of the liquid crystal display device according to the second embodiment, and is also a cross-sectional view of the first substrate, which is in a manufacturing process.

FIG. 12 is an enlarged plan view illustrating part of a liquid crystal display panel of a liquid crystal display device according to a third embodiment, and illustrates signal lines, metal lines, a first electrode, insulating layers, second electrodes, conductive layers, first contact holes, second contact holes, and light-shielding layers.

FIG. 14 is an enlarged plan view illustrating part of a liquid crystal display panel of a liquid crystal display device according to a modification, and illustrates signal lines, a first electrode and second electrodes.

DETAILED DESCRIPTION

In general, according to one embodiment, there is provided a liquid crystal display device comprising: a first substrate, a second substrate located opposite to the first substrate, and a liquid crystal layer held between the first substrate and the second substrate, the first substrate including: an organic insulating film; a first electrode formed on the organic insulating film; an inorganic insulating film formed on the first electrode; a second electrode formed on the inorganic insulating film; and an alignment film formed above the organic insulating film, the first electrode, the inorganic insulating film and the second electrode, the alignment film being in contact with the organic insulating film and the second electrode.

Embodiments will be described hereinafter with reference to the accompanying drawings. The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In the present specification and drawings, after structural elements are each explained once with reference to the drawings, there is a case where their explanations will be omitted as appropriate, and those identical to or similar to the explained structural elements will be denoted by the same reference numbers, respectively, as the explained structural elements.

First Embodiment

A liquid crystal display device according to a first embodiment will be described in detail.

The liquid crystal display device can be used in various devices such as a smartphone, a tablet device, a cell phone, a personal computer, a television receiver, a vehicle equipment and a games console. It should be noted that main structural elements to be described later with respect to the first embodiment can be used in a self-luminous display device such as an organic electroluminescent display device, an electronic paper display device including a cataphoretic element, etc., a display device to which micro electro mechanical systems (MEMS) is applied, or a display device to which electrochromism is applied.

Figure 1:
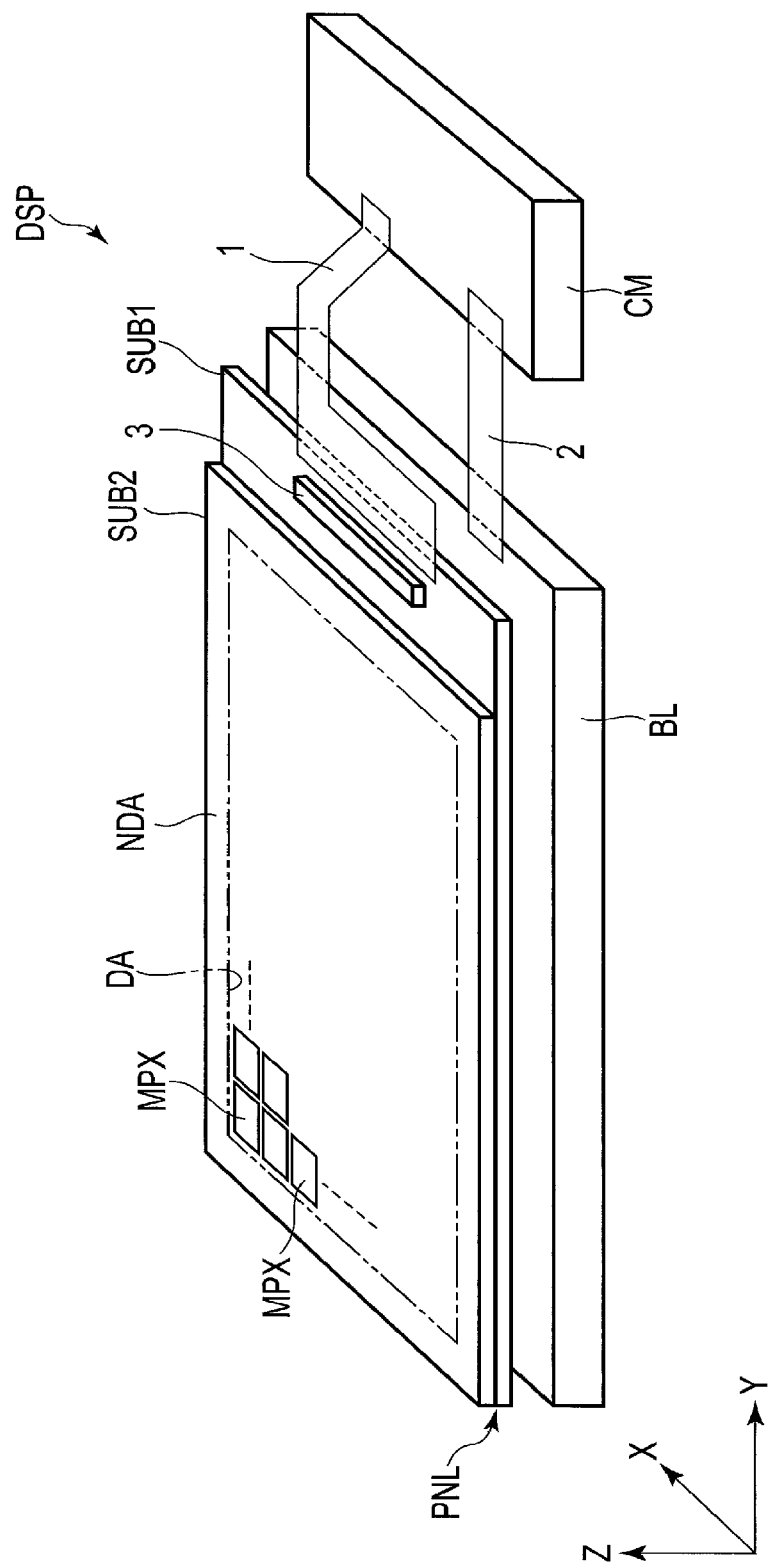
FIG. 1 is a perspective view illustrating a configuration of a liquid crystal display device according to a first embodiment.

FIG. 1 is a perspective view illustrating a configuration of a liquid crystal display device DSP according to the first embodiment. In the first embodiment, a first direction X and a second direction Y are perpendicular to each other; however, they may intersect each other at an angle other than 90°. Also, a third direction Z is perpendicular to each of the first direction X and the second direction Y.

The liquid crystal display device DSP comprises an active-matrix liquid crystal display panel PNL, a driver 3 which drives the liquid crystal display panel PNL, a backlight unit BL which illuminates the liquid crystal display panel PNL, a control module CM, flexible printed circuits 1 and 2, etc.

The liquid crystal display panel PNL comprises a first substrate SUB 1 and a second substrate SUB 2 located opposite to the first substrate SUB1. In the first embodiment, the first substrate SUB1 functions as an array substrate, and the second substrate SUB2 functions as a counter-substrate. The liquid crystal display panel PNL includes a display area DA which displays an image and a non-display area NDA which is formed in the shape of a frame in such a way as to surround the display area DA. The liquid crystal display panel PNL comprises a plurality of main pixels MPX arranged in a matrix in the first direction X and the second direction Y in the display area DA. Each of the main pixels MPX corresponds to a group of three sub-pixels to be described later.

The backlight unit BL is provided on a rear surface of the first substrate SUB1. As the structure of the backlight unit BL, various structures can be applied. However, a detailed explanation of the structure of the backlight unit BL will be omitted. The driver 3 is mounted on the first substrate SUB1. The flexible printed circuit 1 connects the liquid crystal display panel PNL and the control module CM to each other. The flexible printed circuit 2 connects the backlight unit BL and the control module CM to each other.

The liquid crystal display device DSP having the above structure is a so-called transmissive liquid crystal display device in which sub-pixels are selectively caused to transmit light which is incident from the backlight unit BL on the liquid crystal display panel PNL, to thereby display an image. However, the liquid crystal display device DSP may be provided as a reflective liquid crystal display device in which sub-pixels are selectively caused to reflect external light emitted from the outside toward the liquid crystal display panel PNL to display an image or as a transreflective liquid crystal display device having both the functions of the transmissive and reflective liquid crystal display devices.

In the following explanation, it is assumed that a direction from the first substrate SUB1 toward the second substrate SUB2 is an upward direction, and a direction from the second substrate SUB2 toward the first substrate SUB1 is a downward direction. Thus, the third direction Z is the upward direction. Furthermore, in the following, the phrases "formed above" and "formed below" are present, and in descriptions and recitations disclosing, for example, that a second element is formed above or below a first element, they suggest that the second element is separated from the first element, but may be in contact with the first element. In this case, in the case where the first and second elements are separated from each other, a third element may be interposed between the first and second elements. Also, in the following, the phrases "formed on" and "formed under" are present, and in descriptions and recitations disclosing, for example, that a second element is formed on or under a first element, they suggest that the second element is in contact with the first element.

FIG. 2 is a cross-sectional view illustrating the liquid crystal display panel PNL.

As illustrated in FIG. 2, the liquid crystal display panel PNL comprises the first substrate SUB1, the second substrate SUB2, a liquid crystal layer LC, a sealing member SE, a first optical element OD1, a second optical element OD2, etc. The first substrate SUB1 and the second substrate SUB2 will be described later in detail.

The sealing member SE is located in the non-display area NDA, and joins the first substrate SUB1 and the second substrate SUB2 to each other. The liquid crystal layer LC is held between the first substrate SUB1 and the second substrate SUB2. The first optical element OD1 and the liquid crystal layer LC are located on opposite sides of the first substrate SUB1, respectively; that is, they are located opposite to each other with respect to the first substrate SUB1. The second optical element OD2 and the liquid crystal layer LC are located on opposite sides of the second substrate SUB2, respectively; that is, they are located opposite to each other with respect to the second substrate SUB2. The first optical element OD1 and the second optical element OD2 each include a polarizer. It should be noted that each of the first optical element OD1 and the second optical element OD2 may include another optical element such as a retardation film.

FIG. 3 is a view illustrating an example of a pixel array in the display area DA in the liquid crystal display panel PNL. FIG. 3 illustrates two kinds of unit pixels, i.e., unit pixels UPX1 and UPX2.

In such a manner, as illustrated in FIG. 3, the liquid crystal display panel PNL includes two kinds of unit pixels. That is, as the unit pixels, unit pixels UPX1 and UPX2 are provided. The unit pixels UPX1 and UPX2 are minimum unit pixels for use in displaying a color image. The unit pixel UPX1 includes sub-pixels PXR1, PXB1 and PXG1. The unit pixel UPX2 includes sub-pixels PXR2, PXB2 and PXG2.

The sub-pixels PXR1 and PXR2 are first-color sub-pixels, and include color layers CF1 having a first color. The sub-pixels PXB1 and PXB2 are second-color sub-pixels, and include color layers CF2 having a second color different from the first color. The sub-pixels PXG1 and PXG2 are third-color sub-pixels, and include color layers CF3 having a third color different from the first and second colors. For example, the first color is red; the second color is blue; and the third color is green. The color layers CF1 to CF3 are colored resin materials having respective colors. The color layers CF1 to CF3 form a color filter CFR.

However, each of the unit pixels UPX1 and UPX2 may further include a sub-pixel having a color other than red, blue and green. Alternatively, in each of the unit pixels UPX1 and UPX2, the red, blue and green sub-pixels may be replaced with sub-pixels having other colors.

In the following description, for example, light having a wavelength which falls within the range of 380 to 780 nm is defined as visible light. Blue is defined as the color of light whose transmittance has a peak falling within a first wavelength range of 380 nm to less than 490 nm. Green is defined as the color of light whose transmittance has a peak falling within a second wavelength range of 490 nm to less than 590 nm. Red is defined as the color of light whose transmittance has a peak falling within a third wavelength range of 590 to 780 nm.

The unit pixels UPX1 are arranged in the first direction X as rows of unit pixels UPX1. Similarly, unit pixels UPX2 are arranged in the first direction X as rows of unit pixels UPX2. Furthermore, the rows of unit pixels UPX1 arranged in the first direction X and the rows of unit pixels UPX2 arranged in the first direction X are alternately arranged in the second direction Y.

The color layers CF1 to CF3 are disposed in accordance with the layouts of the above sub-pixels, and have areas determined in accordance with the sizes of the sub-pixels. In the first embodiment, the color layers CF1 to CF3 are strip-shaped, and are arranged in the first direction X; and in each of columns of color layers CF1 to CF3, the color layers are arranged in the second direction Y while they are inclined to each other.

Furthermore, the shape of each of the above sub-pixels is not limited to such an almost parallelogram as illustrated in FIG. 3. That is, it may be a square or a rectangle which is longitudinal in the second direction Y.

For example, if the shape of each of the sub-pixels is an almost parallelogram, two kinds of unit pixels, i.e., the unit pixels UPX1 and UPX2, are combined, thereby also forming a large number of domains with respect to the sub-pixels having respective colors, and thus compensating for a viewing-angle characteristic. Thus, with respect to the viewing-angle characteristic, the combination of unit pixels UPX1 and UPX2 (two unit pixels) is a minimum unit in a displayed color image.

It should be noted that each of the unit pixels UPX1 and UPX2 is formed as a single main pixel MPX.

Figure 4:
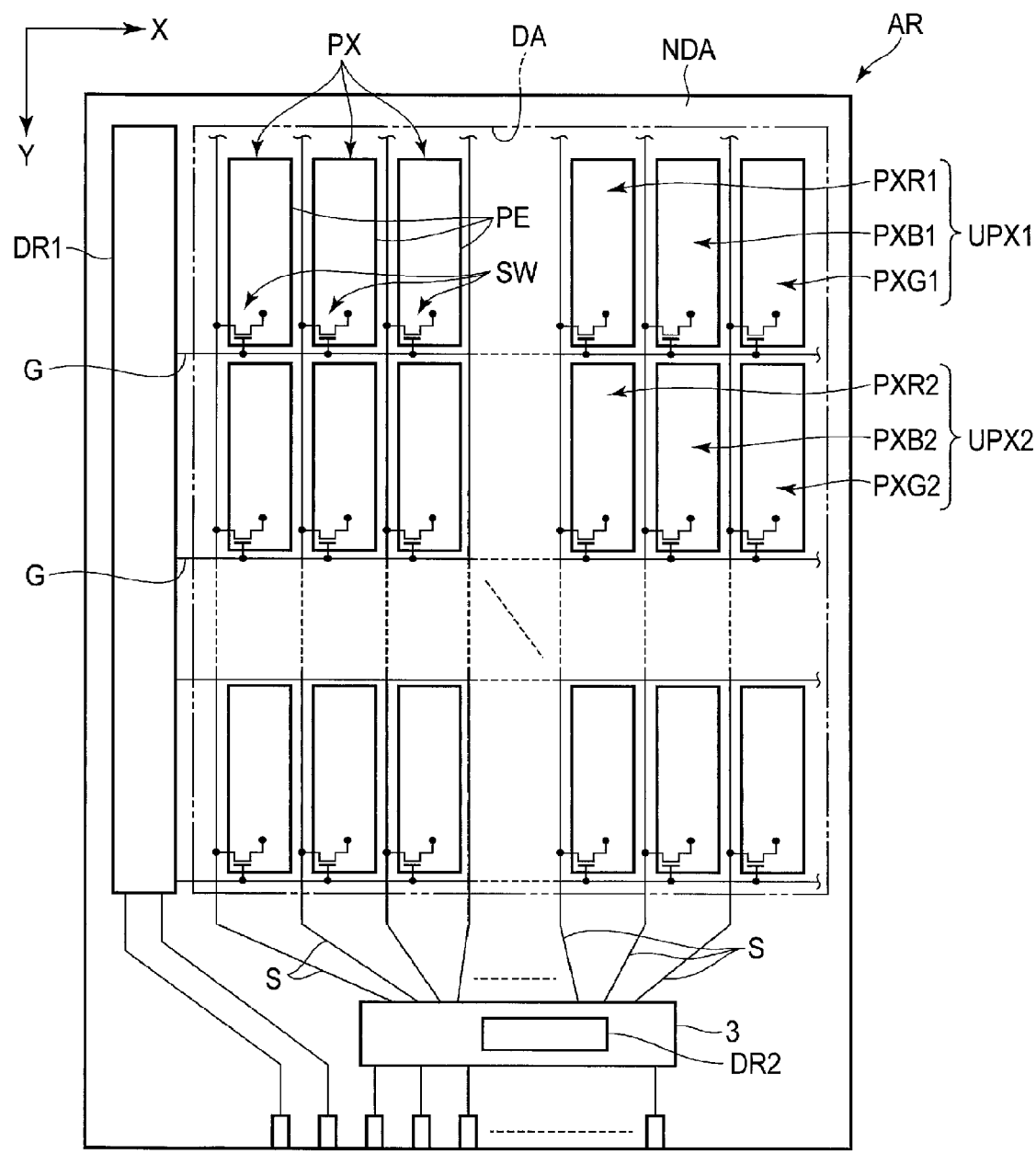
FIG. 4 is a plan view illustrating a configuration of a first substrate as illustrated in FIGS. 1 and 2.

FIG. 4 is a plan view illustrating the configuration of the first substrate SUB1.

As illustrated in FIG. 4, the first substrate SUB1 comprises scanning lines G, signal lines S, second electrodes PE, switching elements SW, a first drive circuit DR1, the driver 3, which includes a second drive circuit DR2, etc.

In the display area DA, the scanning lines G extend in the first direction X, and are arranged and spaced from each other in the second direction Y. In the first embodiment, the scanning lines G linearly extend in the first direction X. Also, in the display area DA, the signal lines S extend in the second direction Y, intersect the scanning lines G, and are arranged and spaced from each other in the first direction X. It should be noted that the signal lines S need not always linearly extend; i.e., they may be partially bent or extend in a direction intersecting the first direction X and the second direction Y. In each sub-pixel PX, a second electrode PE and a switching element SW are provided. The switching element SW is electrically connected to an associated scanning line G and an associated signal line S. The second electrode PE is electrically connected to the switching element SW.

In a region illustrated by way of example in FIG. 4, to a unit pixel UPX1 including three sub-pixels PXR1, PXB1 and PXG1, three signal lines S and a single scanning line G are assigned. Also, to a unit pixel UPX2 including three sub-pixels PXR2, PXB2 and PXG2, three signal lines S and a single scanning line G are assigned.

The first drive circuit DR1 and the second drive circuit DR2 are located in the non-display area NDA. The first drive circuit DR1 is electrically connected to portions of the scanning lines G which are located in the non-display area NDA. The second drive circuit DR2 is electrically connected to portions of the signal lines S which are located in the non-display area NDA. The first drive circuit DR1 supplies a control signal to each of the scanning lines G. The second drive circuit DR2 supplies an image signal (for example, a video signal) to each of the signal lines S.

FIG. 5 is an enlarged plan view illustrating part of the liquid crystal display panel PNL. FIG. 5 illustrates signal lines S, metal lines ML, first electrodes CE, insulating layers 14 (14a, 14b, 14c), second electrodes PE and light-shielding layers SH1 and SH2. In FIG. 5, scanning lines G and switching elements SW formed in the first substrate SUB1 are omitted.

It should be noted that in the example illustrated in FIG. 5, the liquid crystal display panel PNL has a structure adapted for a fringe field switching (FFS) mode applied as a display mode.

As illustrated in FIG. 5, the sub-pixels PX, the second electrodes PE and the signal lines S have the following positional relationship. The sub-pixel PXR1 (a second electrode PER) is formed between signal lines S1 and S2. The sub-pixel PXB1 (a second electrode PEB) is formed between signal lines S2 and S3. Also, The sub-pixel PXG1 (a second pixel PEG) is formed between signal lines S3 and S4.

A metal line ML1 is located opposite to the signal line S1, and extends along the signal line S1. A metal line ML2 is located opposite to the signal line S2, and extends along the signal line S2. A metal line ML3 is located opposite to the signal line S3, and extends along the signal line S3. A metal line ML4 is located opposite to the signal line S4, and extends along the signal line S4.

Light-shielding layers SH1 and SH2 are indicated by chain double-dashed lines. Each of the light-shielding layers SH, for example, the light-shielding layers SH1 and SH2, is formed along the boundaries between pairs of sub-pixels PX adjacent to each other in the second direction Y, and is also formed as an extension portion formed in the shape of a band. The light-shielding layers SH are located opposite to the scanning lines G and the switching elements SW, which are not illustrated in FIG. 5.

Areas surrounded by the light-shielding layers SH and the metal lines ML serve as areas for use in displaying an image. The width of each of the metal lines ML in the first direction X is greater than or equal to that of an associated signal line S in the first direction X. The width of each light-shielding layer SH in the second direction Y is greater than that of each scanning line G in the second direction Y.

The first substrate SUB1 includes a plurality of insulating layers such as insulating layers 14a, 14b and 14c. The insulating layers are provided in the sub-pixels PX, respectively.

The sub-pixel PXR1 includes a first divided portion CE1 of a first electrode CE, the insulating layer 14a and the second electrode PER.

The first divided portion CE1 is located between the metal lines ML1 and ML2, and extends along the metal lines ML1 and ML2 substantially in the second direction Y. The first divided portion CE1 is shared among sub-pixels PXR arranged in the second direction Y. The first divided portion CE1 is spaced from the metal line ML1, and portions of the first divided portion CE1 are connected to the metal line ML2. Furthermore, the first divided portion CE1 includes an opening O1 provided in a region of the first divided portion CE1 which is located opposite to the light-shielding layer SH1. The conductive layer CL is provided in the opening O1, and spaced from the first divided portion CE1 such that they are electrically insulated from each other.

The above insulating layer 14a and second electrode PER are located opposite to the first divided portion CE1.

In the first embodiment, the entire insulating layer 14a is stacked on the first divided portion CE1. Thus, the insulating layer 14a is located without projecting into gaps between the first divided portion CE1 and the metal line ML 1 and between the first divided portion CE1 and the metal line ML2. However, the insulating layer 14a is not limited to the above example, and can be variously modified. The insulating layer 14a may be provided to partially cover the gaps. Thus, the insulating layer 14a may be provided such that it is partially opposite to the gaps, or it is partially stacked on the metal lines ML1 and ML2.

The second electrode PER includes comb-tooth electrodes which project in a direction away from the light-shielding layer SH1. In a region illustrated by way of example in FIG. 5, the second electrode PER includes two comb-tooth electrodes. The comb-tooth electrodes extend along a first divided portion CE1 located opposite to the comb-tooth electrodes. Alternatively, the comb-tooth electrodes extend substantially parallel to the signal lines S1 and S2 (which are adjacent to each other) and the metal lines ML1 and ML2 (which are adjacent to each other). The size of the second electrode PER is smaller than that of the insulating layer 14a, and the entire second electrode PER is stacked on the insulating layer 14a. Thus, the second electrode PER is formed without extending outward of the insulating layer 14a. The second electrode PER is electrically insulated from the first divided portion CE1 by the insulating layer 14a.

The sub-pixel PXB1 includes a second divided portion CE2 of the above first electrode CE, the insulating layer 14b and the second electrode PEB.

The sub-pixel PXG1 includes a third divided portion CE3 of the first electrode CE, the insulating layer 14c and the second electrode PEG.

The sub-pixels PXB1 and PXG1 have the same structure as the sub-pixel PXR1, and their detailed explanations will thus be omitted.

In the first embodiment, the first electrodes CE function as common electrodes. The second electrodes PE, i.e., the second electrodes PER, PEB and PEG, function as pixel electrodes. The first electrodes CE and the second electrodes PE are formed of transparent conductive material such as indium zinc oxide (IZO) or indium tin oxide (ITO). The insulating layers 14 are inorganic insulating layers, and formed of inorganic insulating material such as a silicon nitride (SiN).

The metal lines ML are formed of metal such as molybdenum tungsten (MoW). Preferably, the metal lines ML should be formed of metal having a low optical reflectance. This is because the metal lines ML themselves function as light-shielding layers, as a result of which it is not necessary to provide other light-shielding layers, which are located opposite to the metal lines ML. However, the metal lines ML may be formed of metal having a relatively high optical reflectance, such as aluminum (Al). In this case, other light-shielding layer may be provided opposite to the metal lines ML and extend along the metal lines ML. Such light-shielding layers can be formed of the same material and at the same time as the light-shielding layers SH, or can be formed integral with the light-shielding layers SH.

The divided portions CE1, CE2 and CE3 of the above first electrode CE are given voltages through metal lines ML. Alternatively, the potentials of the divided portions CE1, CE2 and CE3 of the first electrode CE are adjusted to desired values by the voltages applied through the metal lines ML.

FIG. 6 is a cross-sectional view of the liquid crystal display panel PNL which is taken along line VI-VI in FIG. 5.

As illustrated in FIG. 6, the first substrate SUB1 is formed using a first insulating substrate 10 having a light transmitting property, such as a glass substrate or a resin substrate. In a region illustrated in FIG. 6, the first substrate SUB1 comprises a first insulating film 11, a second insulating film 12, a color filter CFR, insulating layers 14 (14a) and 15 (15a), a switching element SW, a first divided portion CE1 (first electrode CE), a conductive layer CL, a second electrodes PER, a first alignment film AL1, etc. In the example illustrated in FIG. 6, the switching element SW is a thin-film transistor having a top-gate structure; however, it may be a thin-film transistor having a bottom-gate structure.

A semiconductor layer SC1 of the switching element SW is formed above the first insulating substrate 10. The semiconductor layer SC is formed of polycrystalline silicon; however, it may be formed of amorphous silicon, an oxide semiconductor or the like. The semiconductor layer SC includes a first region R1, a second region R2 and a third region R3 located between the first region R1 and the second region R2.

The first insulating film 11 is formed on the first insulating substrate 10 and the semiconductor layer SC. The scanning lines G are formed on the first insulating film 11 such that two scanning lines G are opposite to the third region R3. In the first embodiment, the switching element SW is a double-gate thin-film transistor, but may be a single-gate thin-film transistor.

The second insulating film 12 is formed on the scanning lines G and the first insulating film 11. The signal line S1 and a conductive layer RL are formed on the second insulating film 12. The signal line S1 is extended through a contact hole pierced through the first insulating film 11 and the second insulating film 12, and is in contact with the first region R1 of the semiconductor layer SC. The conductive layer RL is extended through another contact hole pierced through the first insulating film 11 and the second insulating film 12, and is in contact with the second region R2 of the semiconductor layer SC.

As an organic insulating film, the color filter CFR including the color layer CF1, etc., is formed on the second insulating film 12, the signal line S1 and the conductive layer RL. In the color filter CFR, a first contact hole CH1 is formed. The first contact hole CH1 is pierced through the color filter CFR to expose an upper surface of the conductive layer RL of the switching element SW.

The first divided portion CE1, the conductive layer CL and the metal line ML1 are formed on the color filter CFR. The opening O1 of the first divided portion CE1 surrounds the first contact hole CH1. The conductive layer CL is located in the opening O1, and is extended through the first contact hole CH1 to contact the conductive layer RL. In the cross section of the first substrate SUB1, the conductive layer CL includes a first bent portion. The size and shape of the first bent portion depend on the first contact hole CH1. The metal line ML1 is located opposite to the signal line S1.

The insulating layer 14a is formed on the first divided portion CE1. In the opening O1, the insulating layer 14a is partially formed on the conductive layer CL, and part of insulating layer 14a which is not formed on the conductive layer CL is formed on the color filter CFR. In the insulating layer 14a, a second contact hole CH2 is formed. The second contact hole CH2 is located opposite to the first contact hole CH1. The second contact hole CH2 is pierced through the insulating layer 14a to expose an upper surface of the conductive layer CL.

The insulating layer 15a is formed on the color filter CFR and the metal line ML1 to cover the metal line ML1. The insulating layer 15 can be formed of the same material and at the same time as the insulating layer 14. It should be noted that not only the insulating layers 14 and 15 but the first insulating film 11 and the second insulating film 12 are formed of inorganic insulating material. As the inorganic insulating material, SiN, silicon oxide (SiO), etc., are present.

The second electrode PER is formed on the insulating layer 14a. Also, the second electrode PER is in contact with the conductive layer CL through the second contact hole CH2. In the cross section of the first substrate SUB1, the second electrode PER includes a second bent portion. The size and shape of the second bent portion depend on the second contact hole CH2. In the first embodiment, the second bent portion is located opposite to the first bent portion, and thus depends on not only second contact hole CH2 but the first bent portion.

The first alignment film AL1 is formed above the color filter CFR, the first divided portion CE1, the conductive layer CL, the metal lines ML1, the insulating layers 14a and 15a, the second electrode PER, etc. The first alignment film AL1 contacts at least the color filter CFR and the second electrode PER. The first alignment film AL1 is formed of material having a horizontal alignment property.

On the other hand, the second substrate SUB2 is formed using a second insulating substrate 20 having a light transmitting property such as a glass substrate or a resin substrate. The second substrate SUB2 comprises the light-shielding layers SH, a second alignment film AL2, etc.

The light-shielding layers SH are formed under the second insulating substrate 20. In other words, the light-shielding layers SH are formed on a side of the second insulating substrate 20 which is located opposite to the first substrate SUB1. The light-shielding layers SH are located opposite to the scanning lines G and the switching elements SW.

The second alignment film AL2 is formed under the second insulating substrate 20 and the light-shielding layers SH. The second alignment film AL2 is formed of material having a horizontal alignment property.

Figure 7:
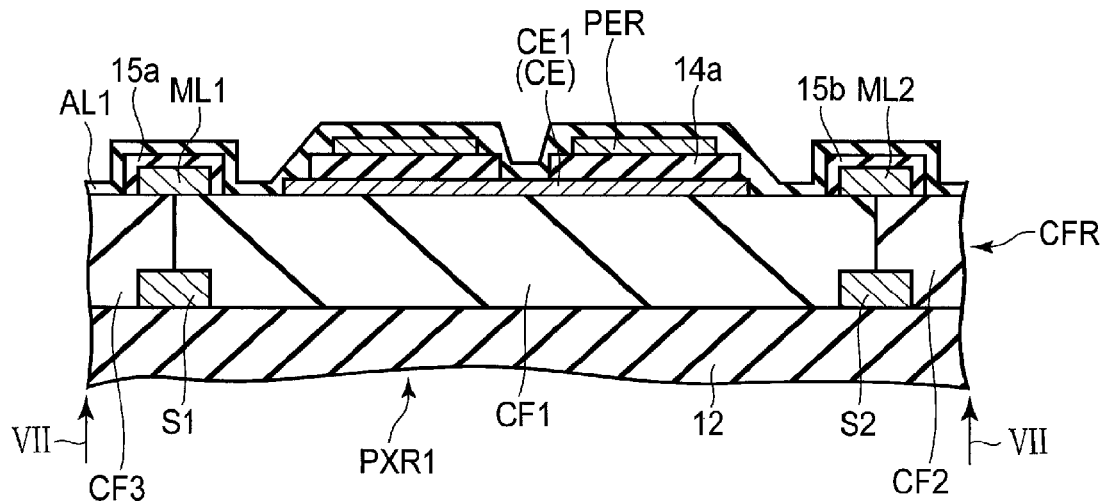
FIG. 7 is a cross-sectional view of the first substrate which is taken along line VII-VII in FIG. 5.

FIG. 7 is a cross-sectional view of the first substrate SUB1 which is taken along line VII-VII in FIG. 5.

As illustrated in FIG. 7, end portions of the color layers CF1, CF2 and CF3 are stacked on the signal lines S. Alternatively, the end portions of the color layers CF1, CF2 and CF3 are located opposite to the metal lines ML.

The insulating layer 15a is formed on the color filter CFR and the metal lines ML1, covers the metal line ML1, and is separated from the insulating layer 14a. The insulating layer 15b is formed on the color filter CFR and the metal line ML2, covers the metal line ML2, and is separated from the insulating layer 14a.

The insulating layer 14a is interposed between the first divided portion CE1 and the second electrode PER. Thus, the first divided portion CE1, insulating layer 14a and the second electrodes PER provide a holding capacitance of the sub-pixel PXR1.

The first electrode CE is not an electrode having a single body formed in the entire display area DA; that is, it is an electrode comprising a plurality of divided portions spaced from each other. For example, the first divided portion CE1 is provided between the metal lines ML1 and ML2, with gaps provided between the first divided portion CE1 and the metal line ML1 and between the first divided portion CE1 and the metal line ML2. Thus, the first electrode CE and the metal lines ML are provided such that they do not completely cover the upper surface of the color filter CFR. The divided portions, i.e., divided portions CE1, CE2 and CE3, are provided in areas which are located opposite to an area where the first alignment film AL1 is in contact with the color filter CFR, and are spaced from each other.

Similarly, the insulating layers provided above the color filter CFR, such as insulating layers 14a, 15a and 15b, do not completely cover the upper surface of the color filter CFR. Thus, the first alignment film AL1 is in contact with the upper surface of the color filter CFR. Areas where the first alignment film AL1 is in contact with the upper surface of the color filter CFR are included in the sub-pixels, respectively. Also, each of these areas serves as a passage for discharging gas such as water vapor gas from the color filter CFR to the outside of the first substrate SUB1.

Figure 8:
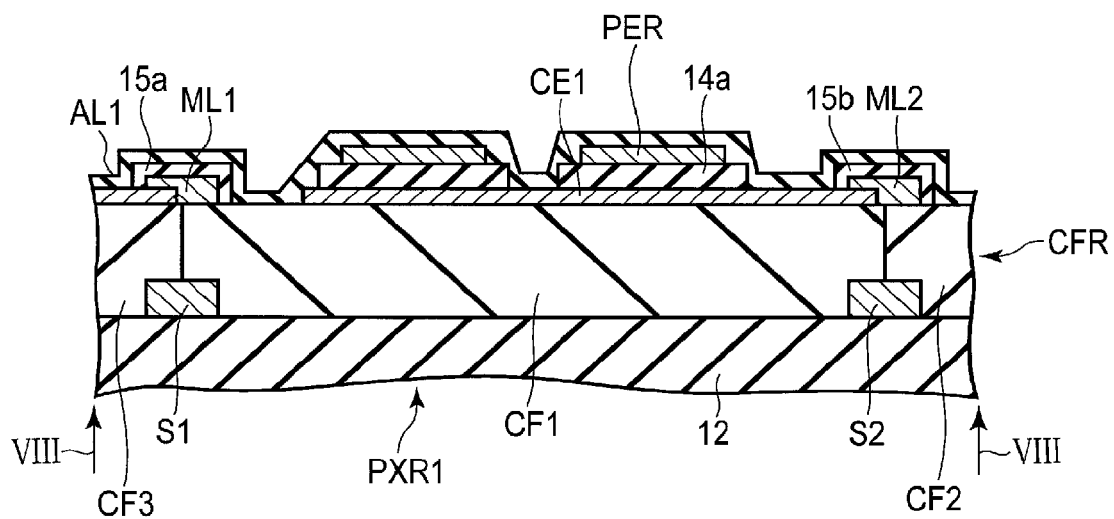
FIG. 8 is a cross-sectional view of the first substrate which is taken along line VIII-VIII in FIG. 5.

FIG. 8 is a cross-sectional view of the first substrate SUB1 which is taken along line VIII-VIII in FIG. 5.

As illustrated in FIG. 8, a plurality of portions of first divided portion CE1 are projected to contact the metal line ML2. Thus, the metal line ML2 is stacked on the above portions of the first divided portion CE1, and electrically connected to the first divided portion CE1.

According to the first embodiment, the liquid crystal display device DSP having the above structure comprises the first substrate SUB1, the second substrate SUB2, and the liquid crystal layer LC, which is held between the first substrate SUB1 and the second substrate SUB2. The first substrate SUB1 includes the color filters CFR, the first electrodes CE, the insulating layers 14a, the second electrodes PER and the first alignment film AL1, the color filters CFR being formed of an organic insulating film, the first electrodes CE being formed on the color filters CFR, the insulating layers 14a being formed as inorganic insulating layers and on the first electrodes CE, the second electrodes PER being formed on the insulating layers 14a, and the first alignment film AL1.

The first alignment film AL1 is located above the color filter CFR, the first electrodes CE, the insulating layers 14a and the second electrodes PER, and is also in contact with the color filters CFR and the second electrodes PER. For example, the first electrodes CE includes the first divided portion CE1, the second divided portion CE2, etc., which are provided in the areas located opposite to the area where the first alignment film AL1 is in contact with the color filter CFR, and which are spaced from each other. The areas where the first alignment film AL1 is in contact with the color filters CFR extend along signal lines S.

The insulating layers 14 and 15, which are formed of SiN or the like, and the first electrodes CE and the second electrodes PE, which are formed of ITO or the like, are not stacked on the entire upper surface of color filter CFR, which is formed of organic material easily absorbing water. A region located above each of the color filters CFR includes a region which does not contain SiN or ITO. In this region, a gas discharge passage can be provided as a passage for discharging gas from the first substrate SUB1 to the outside thereof. Thus, if it is set that the first substrate SUB1 is subjected to a high-temperature process after the first electrode CE is formed above the color filter CFR, even if gas is discharged from the color filter CFR, it can be discharged from the first substrate SUB1 to the outside thereof through the gas discharge passage. This structural feature can prevent inorganic layers such as the insulating layers 14 from being floated from the color filter CFR or peeled off therefrom.

If a single inorganic insulating film is located opposite to the entire upper surface of color filter CFR instead of the insulating layers 14 and 15, it is not desirable, since the gas discharge passage is little, and gas discharged from color filter CFR is easily trapped in the above inorganic insulating film. It should be noted that since the path length of the inorganic insulating film in a horizontal direction is very long, a horizontal passage hardly functions as a gas discharge passage.

If the inorganic insulating film is floated from the color filter CFR, for example, the distance between the first divided portion CE1 and the second electrode PER varies. Thus, the capacity of the sub-pixel PXR1 varies, thus reducing a display quality.

Furthermore, if the inorganic insulating film is peeled off, for example, it may reduce yield as foreign matter such as particles.

By virtue of the above structure, according to the first embodiment, it is possible to obtain liquid crystal display devices DSP in high manufacturing yield. Alternatively, it is possible to obtain liquid crystal display devices DSP in high production yield.

Second Embodiment

A liquid crystal display device DSP according to the second embodiment will be described in detail. FIG. 9 is an enlarged plan view of part of a liquid crystal display panel PNL according to the second embodiment, and illustrates signal lines S, metal lines ML, a first electrode CE, insulating layers 14a, 14b and 14c, second electrodes PER, PEB and PEG and light-shielding layers SH.

As illustrated in FIG. 9, the second embodiment is different from the first embodiment in shape and size of each of insulating layers 14a, 14b and 14c.

In an X-Y plane, the insulating layer 14a has the same area and shape as the second electrode PER; the insulating layer 14b has the same area and shape as the second electrode PEB; and the insulating layer 14c has the same area and shape as the second electrode PEG. The second electrode PER is completely stacked on the insulating layer 14a. The second electrode PEB is completely stacked on the insulating layer 14b. The second electrode PEG is completely stacked on the insulating layer 14c.

FIG. 10 is a cross-sectional view of a first substrate SUB1 which is taken along line X-X in FIG. 9.

As illustrated in FIG. 10, the first electrode CE and the metal lines ML, the insulating layers 14 and 15 and the second electrodes PE are provided such that they do not completely cover the upper surface of a color filter CFR. Thus, a first alignment film AL1 contacts the upper surface of the color filter CFR. The first substrate SUB1 includes a gas discharge passage on an upper surface side of the color filter CFR.

Side surfaces of the insulating layer 14a and second electrode PER are flush with each other.

On the insulating layer 15a, a conductive layer TL1 is formed. The conductive layer TL1 has the same area and shape as the insulating layer 15a, and is completely stacked on the insulating layer 15a. Also, side surfaces of the insulating layer 15a and conductive layer TL1 are flush with each other. Similarly, on the insulating layer 15b, a conductive layer TL2 is formed. The conductive layer TL2 has the same area and shape as the insulating layer 15b, and is completely stacked on the insulating layer 15b. Also, side surfaces of the insulating layer 15b and conductive layer TL2 are flush with each other.

The following is an explanation of a method for forming the insulating layers 14a, 15a and 15b, the second electrode PER and the conductive layers TL1 and TL2 as illustrated in FIG. 10. FIG. 11 is a view for explaining a manufacturing method of the liquid crystal display device DSP according to the second embodiment, and is a cross-sectional view of the first substrate SUB1, which is in a manufacturing process.

As illustrated in FIG. 11, in the manufacturing process of the first substrate SUB1, after the color filter CFR, a first divided portion CE1 (first electrodes CE) and metal lines ML are formed, SiN is applied onto the color filter CFR, the first divided portion CE1 and the metal lines ML, and an insulating film f1 is formed. Then, in the insulating film f1, the above-mentioned second contact hole CH2 is formed. Next, an upper surface of the insulating film f1 is coated with ITO, thereby forming a conductive film f2, and a resist mask RM is formed on the conductive film f2.

Thereafter, wet etching is performed using the resist mask RM as a mask for wet etching, thereby processing the insulating film f2. Furthermore, dry etching is performed also using the resist mask RM as a mask for drying etching, thereby processing the insulating film f1. Then, the resist mask RM is removed. Thereby, the insulating layers 14a, 15a and 15b, the second electrodes PER and the conductive layers TL1 and TL2 are formed.

According to the second embodiment, in the liquid crystal display device DSP having the above structure, the first alignment film AL1 is in contact with color filter CFR as in the first embodiment. Since the gas discharge passage can be provided above the color filter CFR, the inorganic layers such as the insulating layers 14 can be prevented from being floated from the color filter CFR, and being peeled off therefrom.

In the case where for example, the insulating layers 14a, 15a and 15b, are formed by processing the insulating film f1, and for example, the second electrodes PER and the conductive layers TL1 and TL2, are formed by processing the conductive film f2, the insulating film f1 and the conductive film f2 can be processed using the same mask, i.e., the resist mask RM. It is therefore possible to obtain a double-layer structure in which no error is made in positioning layers, i.e., a double-layer structure in which side surfaces of layers are flush with each other. Thus, it is not necessary to consider a margin of positioning each of the layers, unlike the case where the insulating film f1 and the conductive film f2 are processed using different resist masks RM. Therefore, a further minute gas discharge path (gas venting slit) can be formed.

By virtue of the above structure, according to the third embodiment, it is possible to obtain liquid crystal display devices DSP in high manufacturing yield. Alternatively, it is possible to obtain liquid crystal display devices DSP in high production yield.

Third Embodiment

A liquid crystal display device DSP according to the third embodiment will be described in detail. FIG. 12 is an enlarged plan view of part of a liquid crystal display panel PNL according to the third embodiment, and illustrates signal lines S, metal lines ML, a first electrode CE, insulating layers 14a, 14b and 14c, second electrodes PER, PEB and PEG, conductive layers CL, a first contact hole CH1, a second contact hole CH2 and light-shielding layers SH.

As illustrated in FIG. 12, the first electrode CE includes divided portions CE1a, CE2a and CE3a which are provided in respective sub-pixels PX. That is, each of the divided portions CE1a, CE2a and CE3a is not shared among a plurality of sub-pixels PX.

A sub-pixel PXR1 includes the first divided portion CE1a of the first electrode CE, a conductive layer CL, the insulating layer 14a and the second electrode PER. The first divided portion CE1a has no opening corresponding to the above-mentioned opening O1. The first divided portion CE1a and the conductive layer CL are adjacent to each other such that they are electrically insulated from each other. The areas between the metal lines ML will be explained by representatively referring to the area between metal lines ML1 and ML2. In the area, first divided portions CE1a and conductive layers CL are alternately arranged in the second direction Y. These first divided portions CE1a, i.e., a column of first divided portions CE1a, are connected to the metal line ML2.

In a region opposite to the conductive layer CL of sub-pixel PXR1, the first contact hole CH1 and the second contact hole CH2 are spaced from each other. In other words, the second contact hole CH2 is separated from a region opposite to the first contact hole CH1, as seen in plan view. It should be noted that the first contact hole CH1 and second contact hole CH2 are provided in a region opposite to the light-shielding layer SH1.

The insulating layers 14a is located opposite to the first divided portion CE1a and the conductive layer CL. Also, the second electrode PER is located opposite to the first divided portion CE1a and the conductive layer CL.

A sub-pixel PXB1 includes the second divided portion CE2a of the first electrode CE, a conductive layer CL, the insulating layer 14b and the second electrode PEB.

A sub-pixel PXG1 includes the third divided portion CE3a of the first electrode CE, a conductive layer CL, the insulating layer 14c and the second electrode PEG.

The sub-pixels PXB1 and PXG1 have the same structure as the sub-pixel PXR1, and their detailed explanations will thus be omitted.

In the third embodiment, the first electrodes CE function as common electrodes. The second electrodes PE, i.e., the second electrodes PER, PEB and PEG, function as pixel electrodes.

Figure 13:
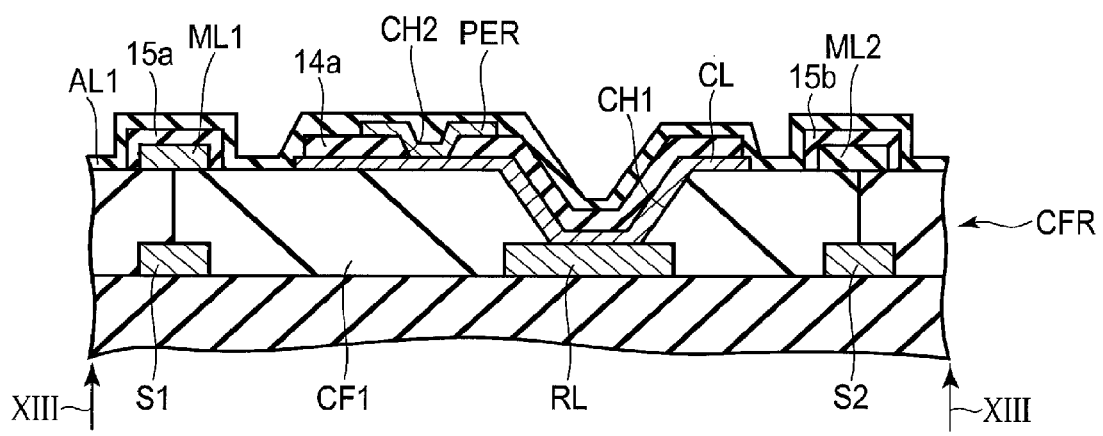
FIG. 13 is a cross-sectional view of the first substrate which is taken along line XIII-XIII in FIG. 12.

FIG. 13 is a cross-sectional view of a first substrate SUB1 which is taken along line XIII-XIII in FIG. 12.

As illustrated in FIG. 13, in the cross section of the first substrate SUB1, the conductive layer CL includes a first bent portion, and the second electrode PER includes a second bent portion. The second bent portion is separated from a region located opposite to the first bent portion.

According to the third embodiment, in the liquid crystal display device DSP having the above structure, a first alignment film AL1 is in contact with a color filter CFR as in the above embodiments. Since a gas discharge passage can be provided above the color filter CFR, inorganic layers such as the insulating layers 14 can be prevented from being floated from color filter CFR, and being peeled off therefrom.

The second contact hole CH2 is displaced from the first contact hole CH1 in a horizontal direction. The second contact hole CH2 can be easily formed, as compared with the case where the contact hole CH2 is located opposite to the first contact hole CH1. It is therefore possible to obtain liquid crystal display panels PNL in high contact yield. To be more specific, it is possible to prevent the conductive layer CL and the second electrode PER from being electrically insulated from each other, since the second contact hole CH2 is pierced and made open. Also, it is possible to prevent an increase in the contact resistance between the conductive layer CL and the second electrode PER, since the opening area of the contact hole CH2 is not short.

It should be noted that unlike the third embodiment, if the second contact hole CH2 is located opposite to the first contact hole CH1, it is hard to minutely process the second contact hole CH2. This is because the thickness of a resist mask for use in processing the second contact hole CH2 is increased by the thickness of the color filter CFR, and it is therefore necessary to increase the amount of exposure in the process of forming the second contact hole CH2.

By virtue of the above structure, according to the third embodiment, it is possible to obtain liquid crystal display devices DSP in high manufacturing yield. Alternatively, it is possible to obtain liquid crystal display devices DSP in high production yield.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, as illustrated in FIG. 14, a single first electrode CE may be formed of a single conductive film provided in the entire display area DA, and be stacked on the entire upper surface of the color filter CFR. However, in this case, the first electrode CE includes a plurality of openings CEo. It suffices that the openings CEo are located in a region where the first alignment film AL1 is in contact with the color filter CFR. In the example illustrated in FIG. 14, the openings CEo are located opposite to signal lines S, and arranged and spaced from each other along the signal lines S. Also, the openings CEo are opposite to light-shielding layers SH not shown. Alternatively, as seen in plan view, the openings CEo intersect the light-shielding layers SH.

Also, a single inorganic insulating film may be provided opposite to the entire upper surface of the color filter CFR instead of the insulating layers 14 and 15. In this case, it suffices that the inorganic insulating film includes a plurality of openings or slits which are located in the region where the first alignment film AL1 is in contact with the color filter CFR.

With respect to the above embodiments, the organic insulating film is explained above by referring to by way of example the color filter CFR. However, the organic insulating film is not limited to this. For example, the organic insulating film may be a transparent organic insulating film. In this case, the color filter CFR can be provided in the second substrate SUB2.

In the above embodiments, the pixel electrodes are located above the common electrodes; however, the common electrodes may be located above the pixel electrodes.

Furthermore, according to each of the above embodiments, the liquid crystal display panel PNL adopts a FFS mode. However, the display mode to be adopted is not limited to the FFS mode; that is, the liquid crystal panel may adopt another display mode.

Each of the above embodiments is not limited to the above liquid crystal display device DSP, and can be applied to various liquid crystal display devices.

What is claimed is:

1. A liquid crystal display device comprising a first substrate, a second substrate located opposite to the first substrate, and a liquid crystal layer held between the first substrate and the second substrate,
   the first substrate including:
   an organic insulating film;
   a first electrode formed on the organic insulating film;
   an inorganic insulating film formed on the first electrode;
   a second electrode formed on the inorganic insulating film;
   an alignment film formed above the organic insulating film, the first electrode, the inorganic insulating film and the second electrode, the alignment film being in contact with the organic insulating film and the second electrode;
   a switching element formed below the organic insulating film;
   a conductive layer formed on the organic insulating film and spaced from the first electrode;

a first contact hole formed in the organic insulating film to expose the switching element;

a second contact hole spaced from a region as seen in plan view, the region being located opposite to the first contact hole, the second contact hole being formed in the inorganic insulating layer to expose the conductive layer, wherein the conductive layer is connected to the switching element through the first contact hole, and the second electrode is connected to the conductive layer through the second contact hole.

2. The liquid crystal display device of claim 1, wherein the organic insulating film is a color filter.

3. The liquid crystal display device of claim 1, wherein the first electrode includes an opening which is located in a region where the alignment film is in contact with the organic insulating film.

4. The liquid crystal display device of claim 1, wherein the first electrode includes a first divided portion and a second divided portion which are located in a region that is located opposite to a region where the alignment film is in contact with the organic insulating film, with a gap interposed between the first and second divided portions.

5. The liquid crystal display device of claim 1, wherein as seen in plan view, the inorganic insulating film has the same area and shape as the second electrode, and the second electrode is completely stacked on the inorganic insulating layer.

6. The liquid crystal display device of claim 1, wherein the first substrate further includes a signal line formed below the organic insulating film, and a region where the alignment film is in contact with the organic insulating film extends along the signal line.

7. A liquid crystal display device comprising a first substrate, a second substrate located opposite to the first substrate, and a liquid crystal layer held between the first substrate and the second substrate, the first substrate including:
an organic insulating film;
a first electrode formed on the organic insulating film;
an inorganic insulating film formed on the first electrode;
a second electrode formed on the inorganic insulating film; and
an alignment film formed above the organic insulating film, the first electrode, the inorganic insulating film and the second electrode, the alignment film being in contact with the organic insulating film and the second electrode, wherein the first substrate further includes a conductive layer formed on the organic insulating film and spaced from the first electrode, and in a cross section of the first substrate, the conductive layer includes a first bent portion, and the second electrode includes a second bent portion spaced from a region located opposite to the first bent portion.

\* \* \* \* \*